(12) United States Patent
Hussain

(10) Patent No.: US 10,900,370 B2
(45) Date of Patent: Jan. 26, 2021

(54) GAS TURBINE ENGINE OFFTAKE

(71) Applicant: ROLLS-ROYCE plc, London (GB)

(72) Inventor: Zahid M. Hussain, Derby (GB)

(73) Assignee: ROLLS-ROYCE plc, London (GB)

( * ) Notice: Subject to any disclaimer, the term of this patent is extended or adjusted under 35 U.S.C. 154(b) by 157 days.

(21) Appl. No.: 16/180,652

(22) Filed: Nov. 5, 2018

(65) Prior Publication Data

US 2019/0170008 A1 Jun. 6, 2019

(30) Foreign Application Priority Data

Dec. 4, 2017 (GB) .................................. 1720158.3

(51) Int. Cl.
| | |
|---|---|
| *F01D 11/20* | (2006.01) |
| *F01D 11/02* | (2006.01) |
| *F01D 9/06* | (2006.01) |
| *F01D 11/24* | (2006.01) |
| *F02C 3/04* | (2006.01) |
| *F02C 9/18* | (2006.01) |
| *F01D 17/10* | (2006.01) |
| *F01D 9/04* | (2006.01) |

(52) U.S. Cl.
CPC .............. *F01D 11/025* (2013.01); *F01D 9/06* (2013.01); *F01D 11/24* (2013.01); *F02C 3/04* (2013.01); *F02C 9/18* (2013.01); *F01D 9/041* (2013.01); *F01D 17/105* (2013.01); *F05D 2220/32* (2013.01); *F05D 2240/55* (2013.01); *F05D 2250/51* (2013.01); *F05D 2260/20* (2013.01)

(58) Field of Classification Search
CPC ........ F01D 11/025; F01D 11/20; F01D 11/22; F01D 11/24; F01D 11/14; F01D 9/06; F01D 17/05; F02C 3/04; F02C 9/18; F04D 29/642
See application file for complete search history.

(56) References Cited

U.S. PATENT DOCUMENTS

| | | | | |
|---|---|---|---|---|
| 7,819,623 | B2 * | 10/2010 | Sutherland | .............. F01D 11/24 415/116 |
| 8,092,153 | B2 * | 1/2012 | Strecker | .................. F01D 9/065 415/115 |
| 2008/0112798 | A1 | 5/2008 | Seitzer et al. | |
| 2010/0150700 | A1 | 6/2010 | Strecker et al. | |

(Continued)

OTHER PUBLICATIONS

Great Britain search report dated May 24, 2018, issued in GB Patent Application No. 1720158.3.

(Continued)

*Primary Examiner* — Kenneth J Hansen
*Assistant Examiner* — Maxime M Adjagbe
(74) *Attorney, Agent, or Firm* — Shumaker & Sieffert, P.A.

(57) ABSTRACT

A tip clearance control (TCC) system 100 is provided to control the gap 176 between the tips of turbine blades 172 of a gas turbine engine 10 and the casing 174 within which they rotate. The inlet 120 to the TCC system is provided in a bifurcation panel 110 that extends across a bypass duct 22 of the gas turbine engine 10. The inlet is provided on a first major surface 112 of the bifurcation panel 110 that is defined such that the direction (R) that points through the bifurcation panel from the first major surface 112 to a second major surface 114 corresponds to the fan rotation direction. This provides a particularly effective and/or efficient TCC system 100.

14 Claims, 3 Drawing Sheets

(56) References Cited

U.S. PATENT DOCUMENTS

| 2010/0215481 | A1  | 8/2010  | Negulescu et al. |
| 2011/0044796 | A1* | 2/2011  | Hussain ................. F02K 3/072 415/115 |
| 2014/0248119 | A1  | 9/2014  | Jen et al. |
| 2015/0330236 | A1  | 11/2015 | Beecroft et al. |
| 2015/0337677 | A1* | 11/2015 | Roberge .................... F02K 3/06 290/52 |
| 2017/0145840 | A1* | 5/2017  | Di Mare ............... F04D 29/544 |

OTHER PUBLICATIONS

Extended European Search Report from counterpart EP Application No. 18204294.5 dated Apr. 12, 2019, 12 pgs.
Response to Extended European Search Report from counterpart EP Application No. 18204294.5 dated Apr. 12, 2019, filed Dec. 2, 2019, 37pgs.
Communication pursuant to Article 94(3) EPC from counterpart EP Application No. 18204294.5 dated Mar. 26, 2020, 7 pgs.
Communication pursuant to Article 94(3) EPC from counterpart EP Application No. 18204294.5 dated Mar. 26, 2020, 1 pgs.
Response to Communication pursuant to Article 94(3) EPC from counterpart EP Application No. 18204294.5 dated Mar. 26, 2020, filed Jul. 27, 2020, 34 pgs.

* cited by examiner

GAS TURBINE ENGINE OFFTAKE

CROSS-REFERENCE TO RELATED APPLICATIONS

This application is based upon and claims the benefit of priority from UK Patent Application Number 1720158.3 filed on 4 Dec. 2017, the entire contents of which are incorporated herein by reference.

BACKGROUND

Technical Field

The present disclosure relates to a gas turbine having a tip clearance control system, and to a method of controlling the size of a gap between blades and a casing in a gas turbine engine.

Description of the Related Art

In use, gas turbine engines operate at high temperatures, which can lead to differential thermal expansion of components. The turbine section of a gas turbine engine can reach particularly high temperatures as it is downstream of the combustor, such that the dimension of a clearance space between the tip of a turbine blade and a shroud may vary during use depending on the operating condition. Leakage between the tip of a turbine blade and its shroud or casing can result in a significant reduction in the turbine's efficiency. Consequences of contact between the blade tip and shroud can be life limiting for the components. Accordingly, there is a desire to maintain an optimum clearance space between the blade tip and shroud during the various operating conditions of a gas turbine engine.

It may be possible to control the expansion and contraction of the turbine casing the introduction of an air supply at a temperature which encourages a desired amount of thermal expansion or contraction of the casing when targeted at the casing from a radially outer side. This allows better control of the gap between the turbine blade and the casing, thereby minimising leakage and improving performance. Such a system may be referred to as a tip clearance control (TCC) system or arrangement.

However, typically such air supply originates from another part of the gas turbine engine, and so may compromise the efficiency of the engine. Furthermore, it is desirable to improve the level of control of the thermal expansion or contraction of the turbine casing for a given impact on engine efficiency.

Accordingly, it is desirable to provide an improved TCC arrangement, for example one which can provide improved tip clearance control and/or one which has reduced impact on engine efficiency.

SUMMARY

According to an aspect, there is provided a gas turbine engine comprising:
an engine core comprising a compressor section, a combustor downstream of the compressor section, and a turbine section downstream of the combustor, the turbine section comprising at least one turbine blade row that is rotatable within a turbine casing;
a tip clearance control system for directing air onto the turbine casing, the temperature of the air allowing a gap between the turbine blades and the turbine casing to be controlled;
a fan upstream of the engine core, the fan being connected to at least a part of the turbine section so as to be driven in a fan rotation direction in use;
a generally annular bypass duct located radially outside the engine core and being defined by a radially inner bypass duct wall and a radially outer bypass duct wall;
a bifurcation panel having first and second major surfaces that each extend from a leading edge to a trailing edge and generally radially across the bypass duct between the radially outer bypass duct wall and the radially inner bypass duct wall, wherein:
the bifurcation panel contains at least a part of an electrical and/or fluid system, thereby allowing the respective system to pass across the bypass duct;
the direction that points through the bifurcation panel from the first major surface to the second major surface corresponds to the fan rotation direction; and
the tip clearance control system has an inlet positioned on the first major surface.

According to an aspect, there is provided a method of controlling the gap between the tips of a row of turbine blades in a turbofan gas turbine engine and a casing within which the turbine blades rotate comprising:
taking air from a bypass flow of the gas turbine engine through an inlet in a first major surface of a bifurcation panel that extends between a radially inner bypass duct wall and a radially outer bypass duct wall; and
directing the air from the inlet onto the turbine casing, wherein:
the bifurcation panel further comprises a second major surface that extends between the radially outer bypass duct wall and the radially inner bypass duct wall, the direction that points through the bifurcation panel from the first major surface to the second major surface corresponding to a rotational direction of a fan of the gas turbine engine; and
the bifurcation panel contains at least a part of an electrical and/or fluid system, thereby allowing the respective system to pass across the bypass duct.

Providing the inlet on the bifurcation panel as described and/or claimed herein may increase the efficiency of the TCC system in comparison with conventional arrangements, for example by providing an improved driving pressure at the inlet to the TCC system. This may result in a TCC arrangement that can provide improved tip clearance control and/or reduced impact on engine efficiency.

Due to the rotation of the fan in use, and the resultant swirl in the bypass flow, the driving (or static) pressure on the first major surface in use may be higher than that on the second major surface. This may improve the effectiveness and/or efficiency of the TCC system.

The that is directed to the turbine casing by the tip clearance control system may be any temperature as required to provide control over the gap between the turbine blades and the turbine casing to be controlled. For example, the temperature of the air that is directed to the turbine casing by the tip clearance control system may be lower than the temperature of the core flow to which the turbine blades and turbine casing that is being cooled are exposed. The air that is delivered to the turbine casing by the tip clearance control system may be referred to as cooling air. The air that is delivered to the turbine casing by the tip clearance control system may be used to reduce the thermal growth of the casing and/or cool the casing and/or reduce the diameter of the casing (relative to its diameter in the absence of the cooling air). The air passing into the inlet of the tip clearance control system may be cooler than the core flow to which the turbine blades and turbine casing that is being cooled are exposed.

Optionally, the temperature of the air delivered by the tip clearance control system may be controlled so as to be at a desired temperature, for example using a heat exchanger.

The air passing into the inlet of the tip clearance control system may be bypass flow. The only rotor blades upstream of the air passing into the inlet of the tip clearance control system may be the fan blades.

The turbine casing within which the turbine blades rotate may comprise a shroud, or shroud portion. The gap to be controlled may be formed between such a shroud, or shroud portion. Accordingly, the TCC system may be said to be for directing air onto the turbine casing shroud (or simply turbine shroud), the temperature of the air allowing a gap between the turbine blades and the turbine casing shroud (or simply turbine shroud) to be controlled.

The gas turbine engine may define axial, radial and circumferential directions in the conventional manner. References to such axial, radial and circumferential directions herein are used according to this conventional definition.

The gas turbine engine may comprise a row of stator vanes extending generally radially across the bypass duct between the radially outer bypass duct wall and the radially inner bypass duct wall, the row of stator vanes being axially upstream of the bifurcation panel. Such stator vanes may be referred to as outlet guide vanes (OGVs). The radial direction may be substantially aligned with the spanwise direction of the vanes. Such stator vanes may be the only stator vanes that the flow passes over before reaching the inlet of the TCC system on the bifurcation panel.

Such stator vanes may remove at least some of the swirl (i.e. circumferential component of the flow) in the bypass duct, but for at least some operating conditions the bypass flow may still have an appreciable swirl component even downstream of theses vanes. Accordingly, the static (or driving) pressure at the first major surface of the bifurcation panel (i.e. on the surface in which the inlet to the TCC system is provided) may be higher than that at the second major surface even in arrangements having such upstream stator vanes.

Such a row of stator vanes may have a camber line (for example average camber line and/or camber line at all cross-sections) that turns towards the axial direction from the leading edge to the trailing edge. Such vanes may be shaped to turn the flow in the bypass duct towards the axial direction, thereby reducing the swirl (circumferential) component of the flow).

The inlet to the tip clearance control system may be located anywhere on the first major surface of the bifurcation panel. For example, the inlet to the TCC system may be closer to the trailing edge of the bifurcation panel than it is to the leading edge of the bifurcation panel. By way of further example, the inlet to the TCC system may be closer to the radially inner wall of the bypass duct than it is to the radially outer wall of the bypass duct.

The outer surface of the bifurcation panel may be an aerofoil shape. Such an aerofoil may be cambered or uncambered, for example it may be a symmetrical aerofoil. Regardless of whether the aerofoil is cambered or uncambered, the inlet to the TCC system may be said to be on the pressure surface of such an aerofoil shape. Regardless of whether the aerofoil is cambered or uncambered, the pressure surface may be defined as the major surface that experiences the higher mean static pressure in use. The first major surface may be a pressure surface. The second major surface may be a suction surface.

The span direction of an aerofoil shaped bifurcation panel may correspond to a substantially radial direction.

The inlet to the tip clearance control system may take any suitable form. For example, the inlet may be substantially flush with the first major surface. The inlet may be in the form of a NACA duct.

The tip clearance control system may have an outlet positioned to supply air (for example cooling air) to the turbine casing. At least a portion of such air may originate from the inlet to the turbine casing.

The bifurcation panel may, for example, contain a plenum that is in direct fluid communication with the inlet to the tip clearance control system. Such a plenum may be contained within the bypass duct, for example within a fairing at which the bifurcation panel meets the radially inner wall of the bypass duct.

The tip clearance control system may comprise a circumferentially extending manifold. Such a manifold may extend around the turbine casing, for example entirely around the turbine casing, for example around the part of the turbine casing to which the TCC system supplies air. The manifold may be directly fluidly connected to at least one outlet positioned to provide air from the tip clearance control system to the turbine casing. Such outlets may, for example, comprise holes and/or openings in the manifold.

The tip clearance control system may further comprise a duct extending from the bifurcation panel towards the turbine casing. Such a duct may extend between a core casing (for example radially outside a core casing) and a core fairing (for example radially inside a core fairing). Such a core fairing may be the same as the radially inner wall of the bypass duct. At least part of such a duct may be flexible. At least part of such a duct may comprise bellows. Such a duct may, for example, extend from the bifurcation panel (for example from the inlet formed in the bifurcation panel or a plenum formed in the bifurcation panel) to a manifold that extends around the turbine casing.

The tip clearance control system may further comprise a valve to regulate the flow rate of air passing into the inlet (and/or be provided to the turbine casing). Such a valve may control the flow rate of air provided to the turbine casing and/or the extent to which the temperature and/or circumference of the turbine casing is changed by the TCC system. Such a valve may allow the flow rate to be varied, rather than being simply an open-closed valve, although in some arrangements the valve may be an on-off valve.

The tip clearance control system may further comprise a control system to control the flow rate of air passing into the inlet, for example based on a predetermined schedule. Such a control system may, for example, control the position of a valve that regulates the flow into the inlet of the TCC system. Purely by way of example, such a control system may be arranged to provide maximum flow at a maximum power condition and/or a condition that corresponds to take-off at an aircraft. In some arrangements, such a maximum flow condition may provide the maximum possible cooling to the turbine casing.

The present disclosure may relate to any suitable gas turbine engine. Purely by way of example, the gas turbine engine may comprise a gearbox positioned between the turbine section and the fan. Such a gearbox may be a reduction gearbox to reduce the rotational speed of the fan relative to the part of the turbine section that drives the fan. Accordingly, the lowest pressure turbine (having the lowest rotational speed) may rotate at a higher speed than the fan.

The skilled person will appreciate that except where mutually exclusive, a feature described in relation to any one of the above aspects may be applied to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
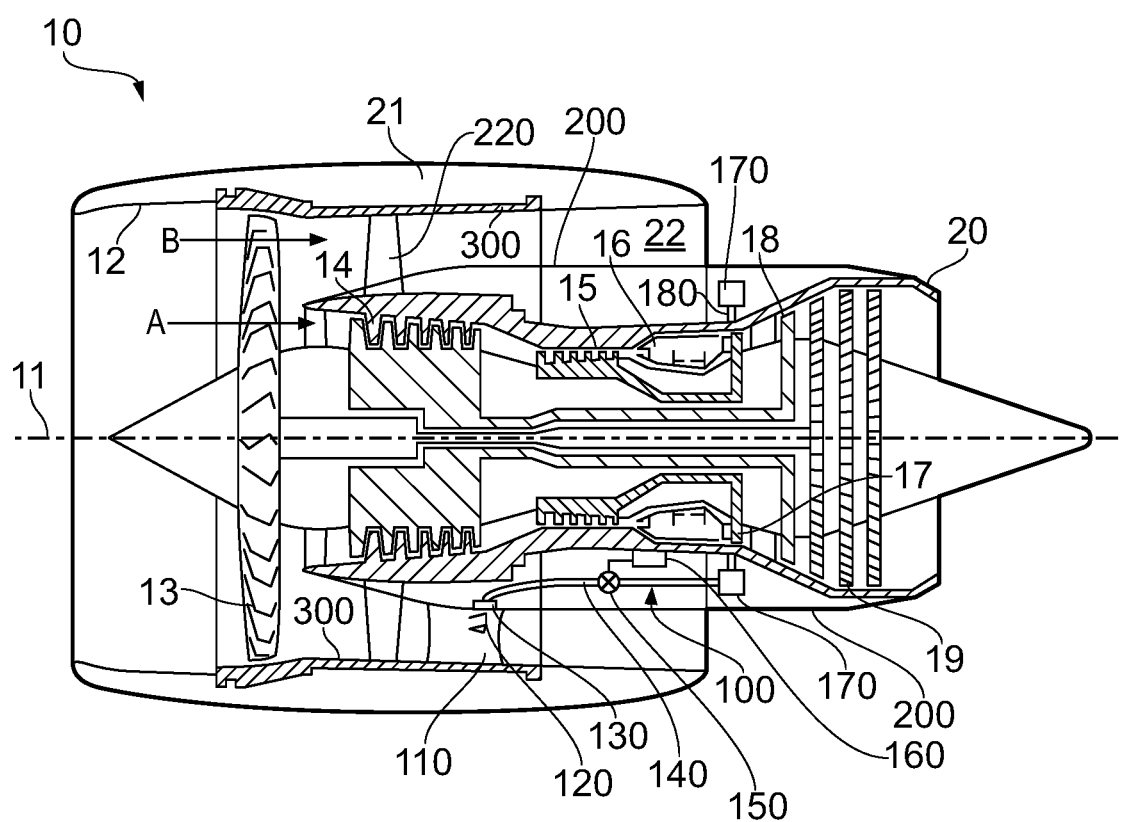
FIG. 1 is a sectional side view of a gas turbine engine in accordance with the present disclosure.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow A into the intermediate pressure compressor 14 and a second air flow B which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

At least one of the compressors 14, 15 and the turbines 17, 18, 19 comprise stages having rotor blades in rotor blade rows and stator vanes in stator vane rows.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan. Further, the engine may not comprise a fan 13 and/or associated bypass duct 22 and/or nacelle 21.

The bypass duct 22 may be said to be defined between a radially inner bypass duct wall 200 and a radially outer bypass duct wall 300. The radially inner bypass duct wall 200 may be an engine core shroud or fairing and/or may be an aerodynamic surface which surrounds the engine core.

The radially outer bypass duct wall 300 may be formed at least in part by a fan casing and/or at least in part by the nacelle 21.

A bifurcation panel 110 extends between the radially inner bypass duct wall 200 and radially outer bypass duct wall 300. The bifurcation panel 110 may provide a passage to allow engine systems to pass across the bypass duct 22. Such engine systems may include, for example, fluid systems (for example hydraulic, oil, or fuel systems), electrical systems and/or mechanical drive systems (for example a drive shaft from an auxiliary gearbox).

In the illustrated example, the gas turbine engine 10 comprises a single bifurcation panel 110, located towards the bottom of the engine 10 when the engine 10 is provided in its normal operating position on an aircraft. However, it will be appreciated that a gas turbine engine 10 may be provided with more than one bifurcation panel 110.

Figure 2:
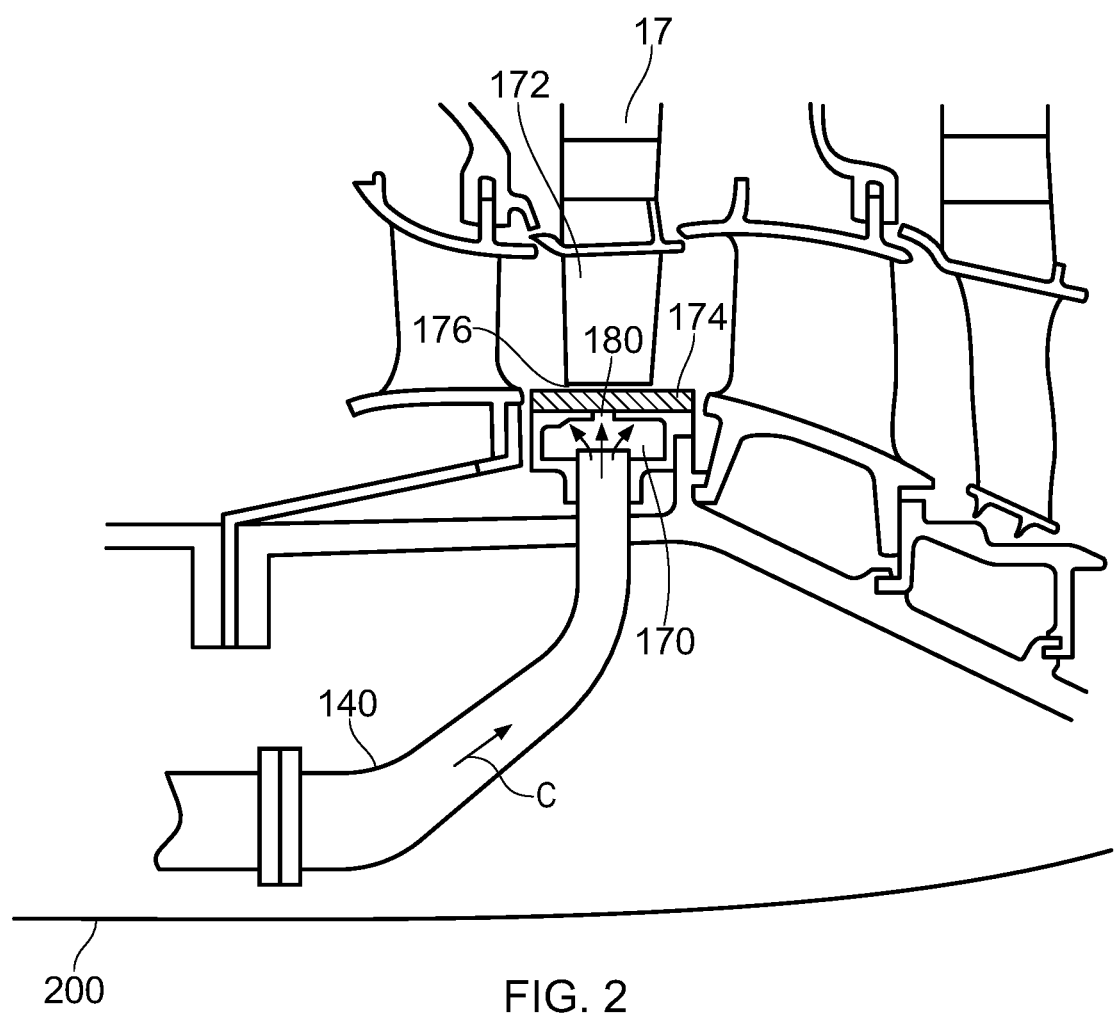
FIG. 2 is a schematic side view showing part of a TCC system in accordance with aspects of the present disclosure.
Figure 3:
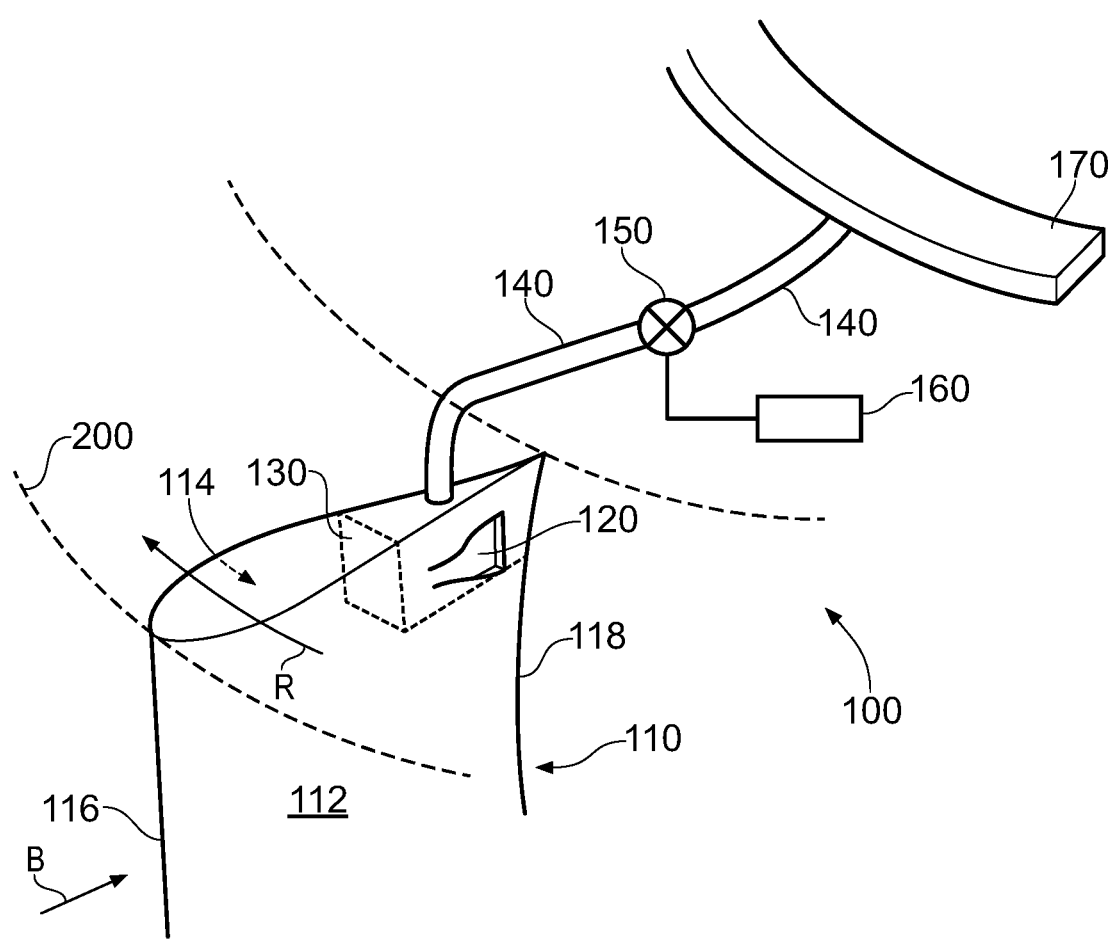
FIG. 3 is another schematic view showing part of a TCC system in accordance with aspects of the present disclosure.

The bifurcation panel 110 has an inlet, or opening, 120 for a tip clearance control (TCC) system 100 provided on its surface. Referring to FIGS. 1, 2 and 3, in operation of the TCC system 100, air enters the inlet 120 from the bypass flow B, flows through a pipe 140 (see arrow C in FIG. 2), and is supplied to a turbine casing (which may be referred to as a turbine shroud) 174. In this way, a gap 176 between the turbine casing 174 and a turbine blade 172 may be controlled by using the air extracted through the inlet 120 from the bypass duct 22 to change the temperature of the turbine casing, thereby changing its radius, and thus adjusting the size of the gap 176. For example, the air supplied to the turbine casing 174 may be cooling air that is used to cool, and thus shrink, the casing 174, thereby reducing the size of the gap 176.

Note that the arrangement shown in FIG. 2 is by way of example only, and various other arrangements may by covered by the scope of the claims of the present disclosure. Purely by way of example, the cooling flow C from the pipe 140 may be delivered to any desired position, depending on the configuration of the TCC system. Thus, for example, the arrangement of FIG. 2 may be referred to as an "internal" TCC arrangement, but the present disclosure also covers other arrangements, such as "external" TCC arrangements in which the cooling flow C may be delivered to an external (for example radially further outer) part of the turbine casing 174, for example via a manifold.

The bifurcation panel 110, and in particular the inlet 120, is shown in greater detail in FIG. 3. The bifurcation panel 110 in the FIG. 3 example is an aerofoil shape. The bifurcation panel 110 in FIG. 3 extends from a leading edge 116 to a trailing edge 118 substantially in the direction of the engine axis 11. A first major surface 112 and a second major surface 114 extend in a generally axial (or chordwise) direction from the leading edge 116 to the trailing edge 118. The first and second major surfaces 112, 114 also extend in a generally radial (or spanwise) direction between the inner bypass duct wall 200 and the outer bypass duct wall 300.

The inlet 120 is provided on the first major surface 112 of the bifurcation panel 110. The first major surface is defined by the rotational direction of the fan 13 in normal use which, of course, is readily understood (for example from the shape of the fan blades) regardless of whether or not the engine 10 is in use. In particular, the direction (indicated schematically by arrow R in FIG. 3) that points through the bifurcation panel 110 from the first major surface 112 to the second major surface 114 corresponds to the fan rotation direction.

The inlet 120 may be provided in any suitable position on the bifurcation panel 110. Purely by way of example, the inlet 120 in the FIG. 3 example is provided towards the trailing edge 118 and the radially inner wall 200.

The bifurcation panel 110 may be a symmetric aerofoil, as in the FIG. 3 example. The camber line of such a symmetric aerofoil may be a straight line between the trailing edge and leading edge, i.e. the bifurcation panel 110 may have no camber. Alternatively, the bifurcation panel 110 may be a non-symmetric aerofoil. In either case, the first major surface 112 may be referred to as a pressure surface, and the second major surface 114 may be referred to as a suction surface. In this regard, in use, the static (or driving) pressure on the first major surface 112 may be higher in use than the static (or driving) pressure on the second major surface 114, as described elsewhere herein.

Although any type of inlet 120 may be used, the FIG. 3 example shows a NACA inlet 120, which may be particularly efficient in extracting flow from the bypass duct 22.

Any suitable arrangement may be used for delivering air from the inlet 120 of the TCC system 100 to the turbine casing 174. In the illustrated example, the air extracted from the bypass flow through the inlet 120 initially enters a plenum 130. The plenum 130 may be inside the bifurcation panel 110, including, for example, within a fairing (which may be referred to as a "keel beam") which may be provided between the inner wall 200 and the first and second major surfaces 112, 114 of the bifurcation panel 110.

In the illustrated example, flow C extracted through the inlet 120 passes (for example via a plenum 130) through a passageway 140 towards the turbine casing 174. From the passageway 140, the flow C is delivered to a manifold 170. The manifold 170 may circumscribe the turbine casing 174, for example a shroud portion of the casing 174, as shown in FIGS. 1 and 2. An outlet (which may be in the form of one or more openings) 180 allows the air in the manifold 170 to be delivered to the casing 174, in one or more desired positions.

The flow rate of TCC flow C that is required to control the gap 176 typically varies in use, for example depending on the operating point of the engine 10. For example, a maximum TCC flow rate may be required during high thrust conditions, for example during take-off. To this end, a valve 150 may be provided to regulate the flow rate extracted through the intake 120 and/or delivered to the turbine casing 174. In the illustrated example, the valve 150 is schematically shown as being provided to the pipe (or conduit) 140, but it will be appreciated that a valve (which may itself be of any suitable form) may be provided at any suitable position in the TCC system.

A control system, for example a controller (which may be an electronic controller) 160 may be provided to control the flow rate C of the TCC flow. Such a control system 160 may be programmed to operate to predetermined schedule based on any desired parameters, such as (purely by way of example), engine operating point, thrust demand, rotational speed and/or temperature and/or pressure at a given engine position.

The gas turbine engine 10 may be provided with an array of stator vanes 220, which may be referred to as outlet guide vanes 220, directly upstream of the bifurcation panel 110, as in the FIG. 1 example. According to such an arrangement, the bypass flow B may (only) have passed through the rotating fan 13 and the stationary stator vanes 220 before being incident on the bifurcation panel 110, a part of which may subsequently be extracted through the inlet 120 of the TCC system 100, as described elsewhere herein. The stator vanes 220 may be shaped to remove some of the swirl (i.e. some of the circumferential component) imparted on the bypass flow B by the rotating fan 13. However, for at least some operating points (and possibly all operating points, including cruise), some swirl (in the fan rotation direction) may remain downstream of the stator vanes 220, for example at least at the radius of the inlet 120 of the TCC system 100. Accordingly, even where stator vanes 220 are present, provision of the inlet 120 on the first major surface 112 may be advantageous in providing a more effective and/or more efficient TCC system.

It will be understood that the invention is not limited to the arrangements above-described and various modifications and improvements can be made without departing from the concepts described herein. Purely by way of example, although the description relates to a TCC system 100 for providing air to a high pressure turbine casing 17, it will be appreciated that a TCC system 100 in accordance with the present disclosure may provide air to the casing surrounding any one or more blade rows in any one or more of a high, intermediate or low pressure turbine 17, 18, 19. By way of further example, the detailed arrangement of the TCC system 100 may take any suitable form in accordance with the claims, and is not limited to the illustrated and/or described arrangement. Except where mutually exclusive, any of the features may be employed separately or in combination with any other features and the disclosure extends to and includes all combinations and sub-combinations of one or more features described herein.

I claim:

1. A gas turbine engine comprising:
an engine core comprising a compressor section, a combustor downstream of the compressor section, and a turbine section downstream of the combustor, the turbine section comprising at least one turbine blade row that is rotatable within a turbine casing;
a tip clearance control system configured to direct air onto the turbine casing, the temperature of the air allowing a gap between the turbine blades and the turbine casing to be controlled;
a fan upstream of the engine core, the fan being connected to at least a part of the turbine section so as to be driven in a fan rotation direction in use;
a generally annular bypass duct located radially outside the engine core and being defined by a radially inner bypass duct wall and a radially outer bypass duct wall;
a bifurcation panel having first and second major surfaces that each extend from a leading edge to a trailing edge and generally radially across the bypass duct between the radially outer bypass duct wall and the radially inner bypass duct wall, wherein:
the bifurcation panel contains at least a part of an electrical and/or fluid system, thereby allowing the at least a part of the electrical and/or fluid system to pass across the bypass duct;
a direction (R) that points through the bifurcation panel from the first major surface to the second major surface corresponds to the fan rotation direction;
the tip clearance control system has an inlet positioned on the first major surface; and
the inlet of the tip clearance control system is closer to the trailing edge of the bifurcation panel than it is to the leading edge of the bifurcation panel.

2. The gas turbine engine according to claim 1, further comprising a row of stator vanes extending generally radially across the bypass duct between the radially outer bypass duct wall and the radially inner bypass duct wall, the row of stator vanes being axially upstream of the bifurcation panel.

3. The gas turbine according to claim 2, wherein the row of stator vanes have a camber line that turns towards the axial direction from the leading edge to the trailing edge.

4. The gas turbine engine according to claim 1, wherein an outer surface of the bifurcation panel is an aerofoil shape.

5. The gas turbine engine according to claim 4, wherein the outer surface of the bifurcation panel is an uncambered aerofoil shape.

6. The gas turbine engine according to claim 1, wherein the inlet of the tip clearance control system is a NACA duct.

7. The gas turbine engine according to claim 1, wherein the tip clearance control system has an outlet positioned to supply air originating from the inlet to the turbine casing.

8. The turbine engine according to claim 1, wherein the bifurcation panel contains a plenum that is in direct fluid communication with the inlet of the tip clearance control system.

9. The gas turbine engine according to claim 1, wherein:
the tip clearance control system comprises a circumferentially extending manifold that extends around the turbine casing; and
the manifold is directly fluidly connected to at least one outlet positioned to provide air from the tip clearance control system to the turbine casing.

10. The gas turbine engine according to claim 1, wherein the tip clearance control system further comprises a duct extending from the bifurcation panel towards the turbine casing.

11. The gas turbine engine according to claim 1, wherein the tip clearance control system further comprises a valve to regulate a flow rate of air passing into the inlet.

12. The gas turbine engine according to claim 1, wherein the tip clearance control system further comprises a control system to control a flow rate of air passing into the inlet based on a predetermined schedule.

13. The gas turbine engine according to claim 1, further comprising a gearbox positioned between the turbine section and the fan so as to reduce rotational speed of the fan relative to a part of the turbine section that drives the fan.

14. A method of controlling the gap between the tips of a row of turbine blades in a turbofan gas turbine engine and a casing within which the turbine blades rotate comprising:
taking air from a bypass flow (B) of the gas turbine engine through an inlet in a first major surface of a bifurcation panel that extends between a radially inner bypass duct wall and a radially outer bypass duct wall, wherein the inlet is closer to the trailing edge of the bifurcation panel than it is to the leading edge of the bifurcation panel; and
directing the air from the inlet onto the turbine casing, wherein:
the bifurcation panel further comprises a second major surface that extends between the radially outer bypass duct wall and the radially inner bypass duct wall, a direction (R) that points through the bifurcation panel from the first major surface to the second major surface corresponding to a rotational direction of a fan of the gas turbine engine; and
the bifurcation panel contains at least a part of an electrical and/or fluid system, thereby allowing the at least a part of the electrical and/or fluid system to pass across the bypass duct.

* * * * *